United States Patent
Feng et al.

(10) Patent No.: US 10,024,702 B2
(45) Date of Patent: Jul. 17, 2018

(54) CASE FOR A VIBRATING METER

(71) Applicant: Micro Motion, Inc., Boulder, CO (US)

(72) Inventors: Xiang Feng, Nanjing (CN); Muyuan Liu, Nanjing (CN); Matthew T Crisfield, Boulder, CO (US); Yang Ye, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 315 days.

(21) Appl. No.: 14/648,514

(22) PCT Filed: Dec. 17, 2012

(86) PCT No.: PCT/CN2012/086729
§ 371 (c)(1),
(2) Date: May 29, 2015

(87) PCT Pub. No.: WO2014/094197
PCT Pub. Date: Jun. 26, 2014

(65) Prior Publication Data
US 2015/0300860 A1 Oct. 22, 2015

(51) Int. Cl.
*G01F 1/84* (2006.01)
*G01F 15/14* (2006.01)
*B65D 85/38* (2006.01)

(52) U.S. Cl.
CPC ............ *G01F 1/8413* (2013.01); *B65D 85/38* (2013.01); *G01F 1/8477* (2013.01); *G01F 15/14* (2013.01)

(58) Field of Classification Search
CPC ........ G01F 1/8413; G01F 1/8418; G01F 15/14
See application file for complete search history.

(56) References Cited

U.S. PATENT DOCUMENTS

| 2003/0140712 A1* | 7/2003 | Barger | G01F 1/8404 73/861.354 |
| 2005/0039547 A1 | 2/2005 | Bitto et al. | |
| 2005/0103782 A1* | 5/2005 | O'Brien | E03B 7/095 220/4.24 |
| 2005/0139015 A1* | 6/2005 | Gebhardt | G01F 1/8409 73/861.357 |

(Continued)

FOREIGN PATENT DOCUMENTS

| CN | 2743799 Y | 11/2005 |
| CN | 101308038 A | 11/2008 |

(Continued)

OTHER PUBLICATIONS

Sitrans F Coriolis Flowmeters Operating Instructions, Siemens, Jun. 2012, see image on cover.*

(Continued)

*Primary Examiner* — Daniel J Colilla
(74) *Attorney, Agent, or Firm* — The Ollila Law Group LLC (57) ABSTRACT

A case (330) for a vibrating meter (300) is provided. The case (330) includes a first panel (331a) defined by at least a first edge (333) and a second edge (334). The case (330) also includes one or more indentations (332) formed in the first panel (331a). The one or more indentations (332) include at least a portion extending from the first edge (333) to the second edge (334). The resonant frequencies of the case can be increased and separated from the intended drive frequencies of the fluid conduits (306A, 306B).

12 Claims, 7 Drawing Sheets

(56) References Cited

U.S. PATENT DOCUMENTS

| | | | |
|---|---|---|---|
| 2009/0272200 A1* | 11/2009 | Frahnow | B81B 3/0032 |
| | | | 73/861.355 |
| 2011/0197681 A1 | 8/2011 | Rieder et al. | |
| 2013/0086986 A1* | 4/2013 | Lanham | G01F 1/8409 |
| | | | 73/649 |

FOREIGN PATENT DOCUMENTS

| | | |
|---|---|---|
| CN | 101943592 A | 1/2011 |
| CN | 102243088 A | 11/2011 |
| JP | 05-014642 U | 2/1993 |
| JP | 2003-299541 A | 10/2003 |
| JP | 2012-242026 A | 10/2012 |
| WO | 0133174 A1 | 5/2001 |
| WO | 2012005735 A1 | 1/2012 |

OTHER PUBLICATIONS

LZYN Mass Flowmeter Instruction Manual, Version 1.0, Mar. 2009, see image on cover.*

* cited by examiner

CASE FOR A VIBRATING METER

TECHNICAL FIELD

The embodiments described below relate to, vibrating meters, and more particularly, to a vibrating meter with a case having increased resonant vibrational frequency characteristics.

BACKGROUND OF THE INVENTION

Vibrating meters such as, for example, densitometers, volumetric flow meters, and Coriolis flow meters are used for measuring one or more characteristics of substances, such as, for example, density, mass flow rate, volume flow rate, totalized mass flow, temperature, and other information. Vibrating meters include one or more conduits, which may have a variety of shapes, such as, for example, straight, U-shaped, or irregular configurations.

The one or more conduits have a set of natural vibration modes, including, for example, simple bending, torsional, radial, and coupled modes. The one or more conduits are vibrated by at least one driver at a resonant frequency in one of these modes, hereinafter referred to as the drive mode, for purposes of determining a characteristic of the substance. One or more meter electronics transmit a sinusoidal driver signal to the at least one driver, which is typically a magnet/coil combination, with the magnet typically being affixed to the conduit and the coil being affixed to a mounting structure or to another conduit. The driver signal causes the driver to vibrate the one or more conduits at the drive frequency in the drive mode. For example, the driver signal may be a periodic electrical current transmitted to the coil.

One or more pick-offs detect the motion of the conduit(s) and generate a pick-off signal representative of the motion of the vibrating conduit(s). The pick-off is typically a magnet/coil combination, with the magnet typically being affixed to one conduit and the coil being affixed to a mounting structure or to another conduit. The pick-off signal is transmitted to the one or more electronics; and according to well-known principles, the pick-off signal may be used by the one or more electronics to determine a characteristic of the substance or to adjust the driver signal, if necessary.

Typically, in addition to the conduits, vibrating meters are also provided with a case. The case can protect the conduits from the environment as well as provide secondary containment in the event of a conduit failure. The vibrational characteristics of the case can cause significant measurement problems. The measurement problems caused by the case are due to the difficulty in differentiating vibrations associated with the conduits from vibrations associated with the meter's case. One reason for the difficulty is that similar to the conduits, the case also has one or more natural modes of vibration, including for example, simple bending, torsional, radial, and lateral modes. The particular frequency that induces a mode of vibration generally depends on a number of factors such as the material used to form the case, the thickness of the case, the shape of the case, temperature, pressure, etc. Vibrational forces generated by the driver or from other sources in the material processing system, such as pumps, may cause the case to vibrate in one of the natural modes. It is difficult to generate an accurate measurement of a characteristic of the substance in situations where the frequency used to drive the one or more conduits in the drive mode corresponds to a frequency that causes the case to vibrate in one of its natural modes of vibration. The vibrational modes of the case can interfere with the vibration of the conduits leading to erroneous measurements.

One reason for vibrational interference of the case is due to the relatively large side panels of some cases. Such a case is shown in FIG. 1.

Figure 1:
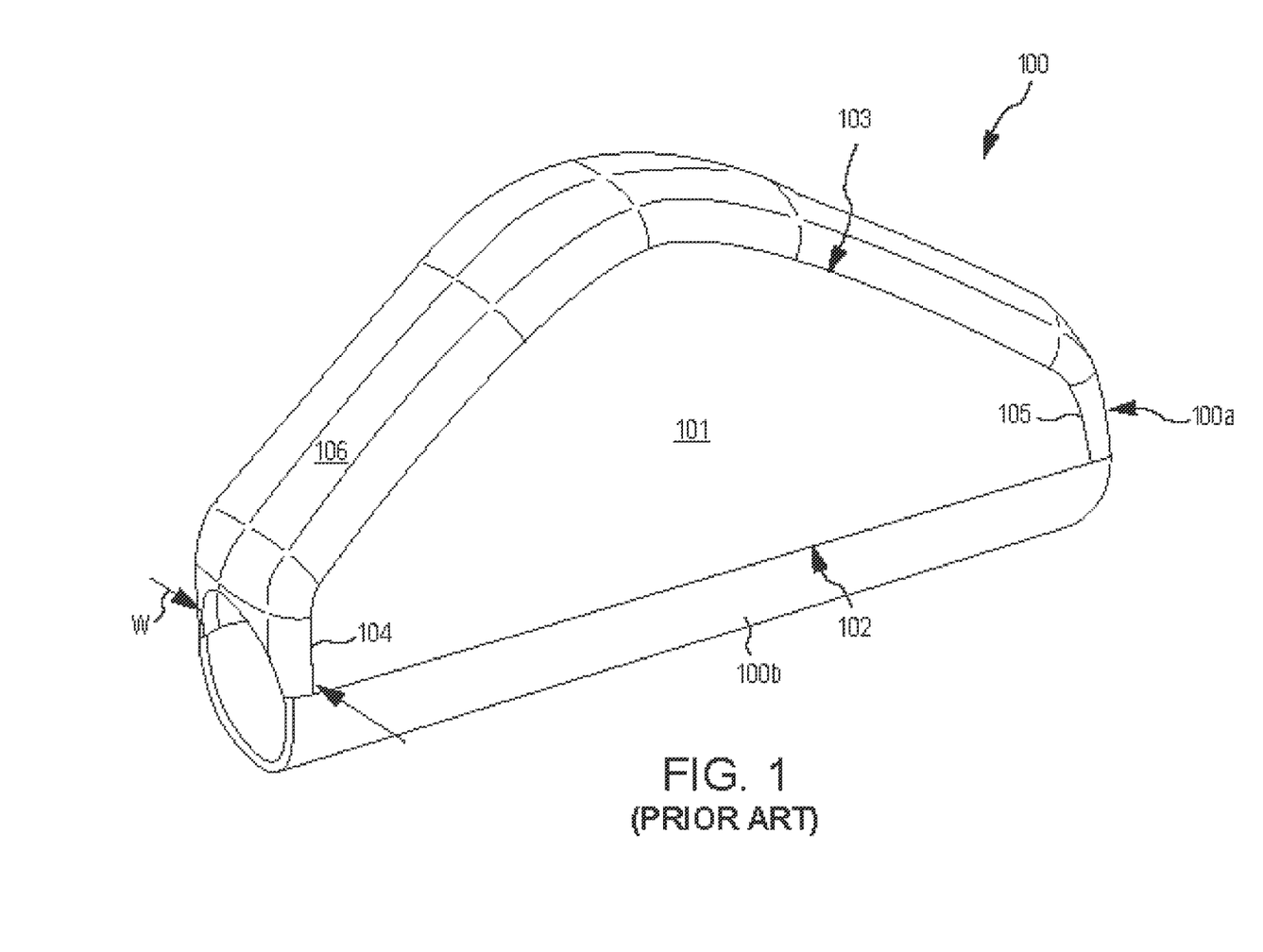
FIG. 1 shows a prior art case for a vibrating meter.

FIG. 1 shows a prior art case 100 for a vibrating meter. The case 100 includes a first case portion 100a and a second case portion 100b. In use, the case 100 can surround other components of the vibrating meter (See FIGS. 3 & 4). The case 100 and more particularly, the first case portion 100a, comprises a first panel 101. The first panel 101 is generally flat, but may include some curvature. The first panel 101 extends from a first edge 102, which is shown at the bottom of the case 100 as shown in the figure, to a second edge 103 at the top of the case. The first panel 101 also extends from a third edge 104 on a first end of the case 100 to a fourth edge 105 at a second end of the case 100. The edges 102, 103, 104, and 105 can define an outer boundary of the first panel 101. The first edge 102 comprises the end of the first case portion 100a and provides a boundary for the second case portion 100b to be coupled to. The second 103, third 104, and fourth 105 edges create the boundary between the panel 101 and a transition section 106. The transition section 106 comprises a curved region that joins opposing panels 101 (the panel visible in FIG. 1 and the other panel on the opposite side of the case 100, which is not visible in FIG. 1). The transition section 106 can generally define the overall width, w, of the case 100. According to an embodiment, the edges 102, 103, 104, 105 can substantially change the direction of the case 100, for example. As can be seen, the panel 101 is generally flat; however, upon reaching an edge 102, 103, 104, or 105, the direction substantially changes and is no longer flat, thereby creating a boundary and end of the panel 101. As can be appreciated, the opposite side of the case 100 looks substantially the same and includes the same components and thus, is not shown for brevity of the description.

As can be appreciated, the panel 101 is relatively large with respect to the overall size of the case 100 and for a given material and thickness can have a relatively low resonant frequency. In some embodiments, the relatively low resonant frequency can overlap with the intended drive frequency of the conduits contained within the case 100. This overlap can create measurement problems in vibrating meters.

There have been numerous prior art attempts to separate the frequencies that induce the case's vibrational modes from the conduits' vibrational modes. These frequencies may comprise the natural resonant frequencies of the various vibrational modes of the case and the fluid filled conduits. For example, the case can be made extremely stiff and/or massive in order to separate the frequencies that induce the various vibrational modes away from the anticipated drive mode of the conduits. Both of these options have serious drawbacks. Increasing the mass and/or stiffness of the case results in complex and difficult manufacturing, this adds cost and makes mounting the vibrating meter difficult. One specific prior art approach to increasing the mass of the case has been to weld metal weights to an existing case. This approach does not adequately dissipate vibrational energy in order to separate the case's resonant frequencies well away from the intended drive frequency. Further, this approach is often costly and produces an unsightly case.

Figure 2:
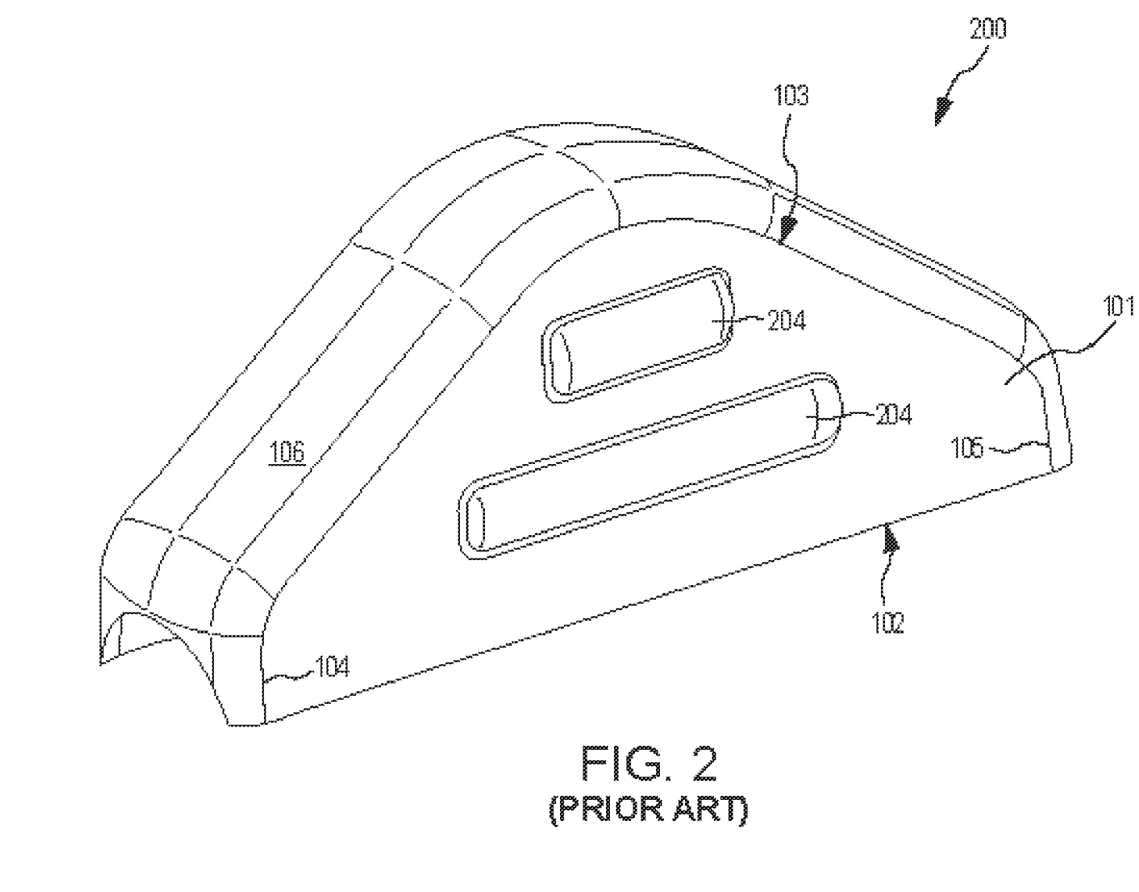
FIG. 2 shows another prior art case for a vibrating meter.

Another prior art approach to separating the frequencies that induce the case's vibrational modes from the intended drive frequency has been to add ribs to the case. The ribs are either coupled to the case or formed as part of the case. Such an approach can be seen in FIG. 2 showing a prior art case 200. The ribs 204 extend along a small portion of the case's panel 101 in an attempt to increase the case's resonant frequencies in an attempt to exceed the intended drive frequency. However, the ribs often fail to provide complete frequency separation. Therefore, there exists a need in the art for a case having vibrational characteristics that are adequately separated from the intended drive frequency of the conduits without suffering from the above-mentioned drawbacks. The embodiments described below overcome these and other problems and an advance in the art is made. The embodiments described below comprise a case including one or more indentations formed in one or both of the case's panels and extending completely from a first panel edge to a second panel edge. By extending the indentations completely between two panel edges, the case's resonant frequencies are increased.

SUMMARY OF THE INVENTION

A case for a vibrating meter is provided according to an embodiment. The case comprises a first panel defined by at least a first edge and a second edge. According to an embodiment, the case further comprises one or more indentations formed in the first panel and including at least a portion extending from the first edge to the second edge.

A sensor assembly for a vibrating meter is provided according to an embodiment. The sensor assembly comprises one or more fluid conduits. According to an embodiment, the sensor assembly further comprises a driver coupled to the one or more fluid conduits to vibrate the one or more fluid conduits and one or more pick-offs coupled to the one or more fluid conduits to sense a motion of the one or more fluid conduits. A case is also provided. The case encloses at least a portion of the one or more fluid conduits. According to an embodiment, the case comprises a first panel defined by at least a first edge and a second edge and one or more indentations formed in the first panel and including at least a portion extending from the first edge to the second edge.

A method for increasing a resonant frequency of a case for a vibrating meter is provided according to an embodiment. The method comprises a step of forming one or more indentations in at least a first panel of the case with each of the one or more indentations including at least a portion extending from a first edge of the first panel to a second edge of the first panel.

ASPECTS

According to an aspect, a case for a vibrating meter comprises:
 a first panel defined by at least a first edge and a second edge; and
 one or more indentations formed in the first panel and including at least a portion extending from the first edge to the second edge.

Preferably, the second edge comprises at least a portion of a boundary between the first panel and a transition section separating the first panel from a second panel.

Preferably, the case further comprises one or more indentations formed in the second panel and including at least a portion extending from the first edge to the second edge.

Preferably, the one or more indentations protrude from the remainder of the first panel a maximum distance, $t_1$, proximate the second edge.

According to another aspect, a sensor assembly for a vibrating meter comprises: one or more fluid conduits;
 a driver coupled to the one or more fluid conduits to vibrate the one or more fluid conduits;
 one or more pick-offs coupled to the one or more fluid conduits to sense a motion of the one or more fluid conduits; and
 a case enclosing at least a portion of the one or more fluid conduits and including:
  a first panel defined by at least a first edge and a second edge; and
  one or more indentations formed in the first panel and including at least a portion extending from the first edge to the second edge.

Preferably, the second edge comprises at least a portion of a boundary between the first panel and a transition section separating the first panel from a second panel.

Preferably, the sensor assembly further comprises one or more indentations formed in the second panel and including at least a portion extending from the first edge to the second edge.

Preferably, the one or more indentations protrude from the remainder of the first panel a maximum distance, $t_1$, proximate the second edge.

According to another aspect, a method for increasing a resonant frequency of a case for a vibrating meter comprises a step of:
 forming one or more indentations in at least a first panel of the case with each of the one or more indentations including at least a portion extending from a first edge of the first panel to a second edge of the first panel.

Preferably, the second edge comprises at least a portion of a boundary between the first panel and a transition section separating the first panel from a second panel.

Preferably, the method further comprises a step of forming one or more indentations in the second panel with each of the one or more indentations including at least a portion extending from the first edge to the second edge of the second panel.

Preferably, the step of forming the one or more indentations comprises protruding the one or more indentations from the remainder of the first panel a maximum distance, $t_1$, proximate the second edge.

DETAILED DESCRIPTION OF THE INVENTION

FIGS. 3-7 and the following description depict specific examples to teach those skilled in the art how to make and use the best mode of embodiments of a vibrating meter case. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibrating meter case. As a result, the embodiments described below are not limited to the specific examples described below, but only by the claims and their equivalents.

Figure 3:
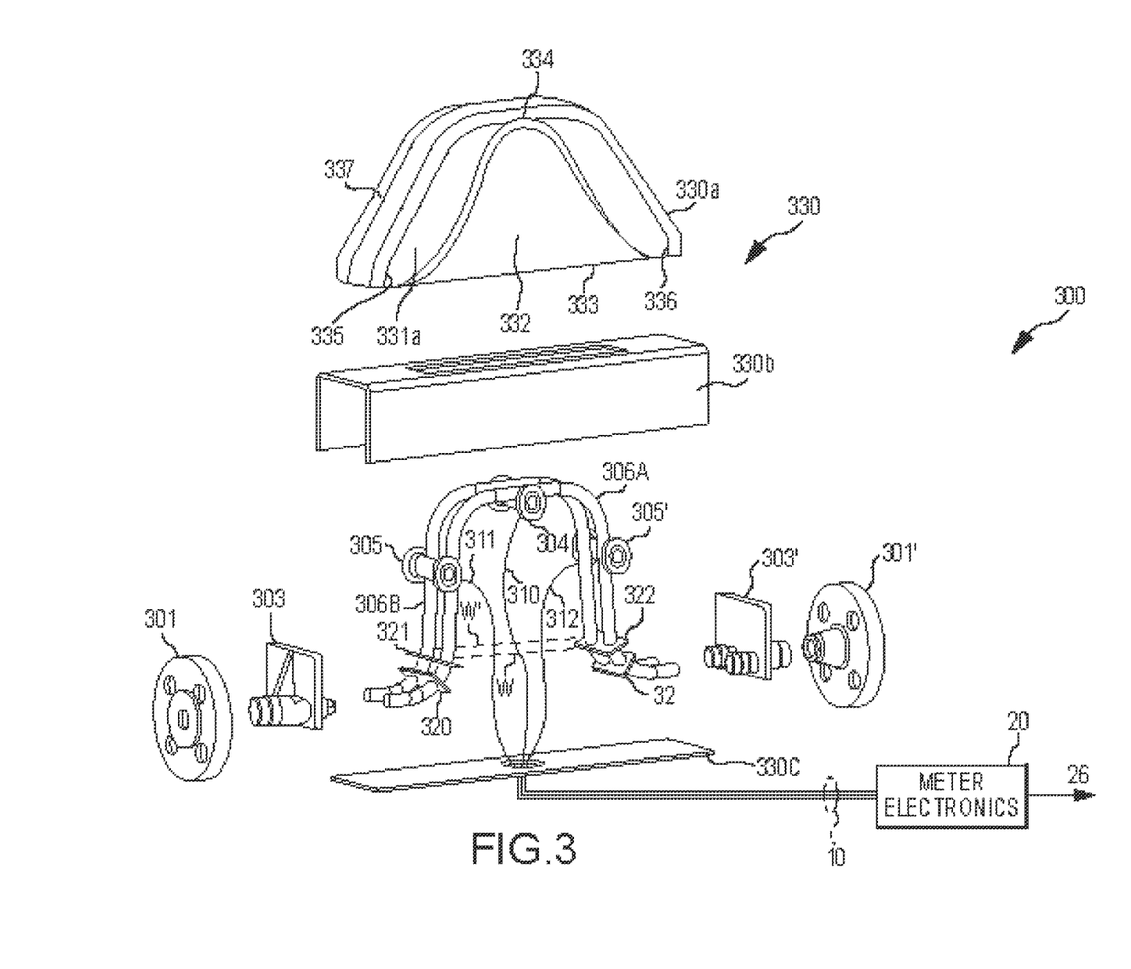
FIG. 3 shows a vibrating meter with a case according to an embodiment.
Figure 4:
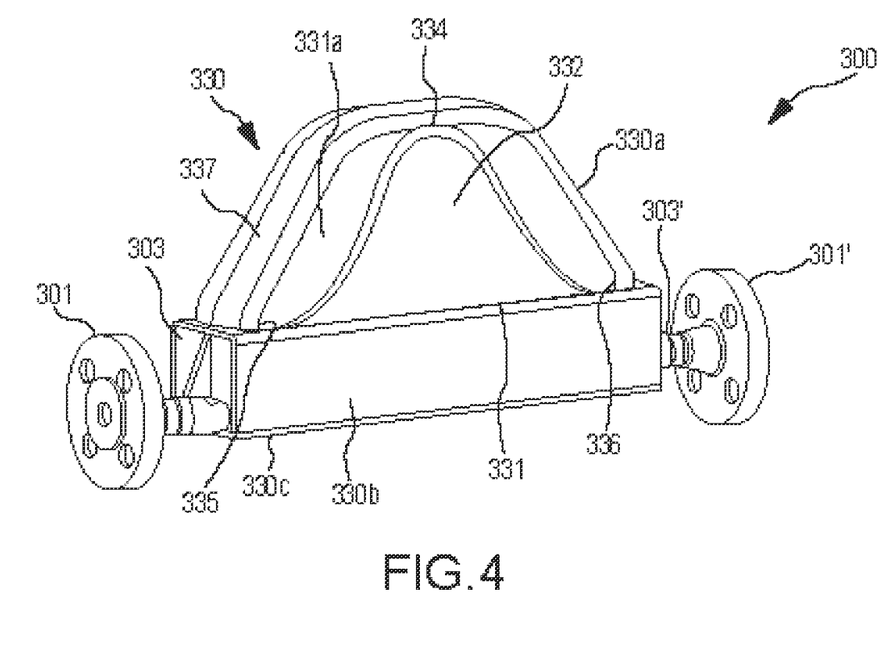
FIG. 4 shows the vibrating meter with the case according to another embodiment.

FIGS. 3 and 4 show a vibrating meter 300 according to an embodiment. FIG. 3 shows the vibrating meter 300 in a partially exploded view while FIG. 4 shows the vibrating meter 300 assembled. FIGS. 3 & 4 show the vibrating meter 300 in the form of a meter comprising a sensor assembly 30 and one or more meter electronics 20. The vibrating meter 300 may comprise a Coriolis flow meter, an ultrasonic flow meter, a volumetric flow meter, a vibrating densitometer, etc. The meter electronics 20 is connected to the sensor assembly 30 via leads 10 to measure a characteristic of a substance, such as, for example, a fluid density, a mass flow rate, a volume flow rate, a totalized mass flow, a temperature, and other information over path 26.

The sensor assembly 30 of the present example includes a pair of flanges 301, 301'; manifolds 303, 303'; a driver 304; pick-offs 305, 305'; and fluid conduits 306A, 306B. The driver 304 and pick-offs 305, 305' are coupled to conduits 306A and 306B. The driver 304 is shown affixed to conduits 306A, 306B in a position where the driver 304 can vibrate the conduits 306A, 306B in a drive mode. The conduits 103A, 103B vibrate about bending axes W, W', respectively. The bending axes W, W' are at least partially defined by brace bars 320, 321, 322, 323 coupled to the conduits 306A, 306B. The pick-offs 305, 305' are affixed to conduits 306A, 306B in order to detect motion of the vibrating portion of the conduits 306A, 306B.

The sensor assembly 30 can also include a case 330, which may comprise two or more case portions 330a, 330b, 330c to allow some of the components of the sensor assembly 30 to be enclosed by the case 330. For example, in the embodiment shown in FIGS. 3 & 4, the case 330 includes three case portions 330a, 330b, 330c, which can surround at least a portion of the conduits 306A, 306B and a portion of the manifolds 303, 303'. The case portions 330a, 330b, 330c can then be coupled to one another in some manner, typically welding to enclose and protect some of the sensor assembly's components.

It should be appreciated to those skilled in the art that it is within the scope of the present embodiment to use the principles discussed herein in conjunction with any type of vibrating meter, including vibrating meters that lack the measurement capabilities of a Coriolis flow meter. Examples of such devices include, but are not limited to, vibrating densitometers, volumetric flow meters, etc.

Flanges 301, 301' of the present example are coupled to manifolds 303, 303'. Manifolds 303, 303' of the present example are affixed to opposite ends of the conduits 306A, 306B. When the sensor assembly 30 is inserted into a pipeline system (not shown) which carries the substance, the substance enters sensor assembly 30 through the flange 301, passes through the inlet manifold 303 where the total amount of material is directed to enter the conduits 306A, 306B, flows through the conduits 306A, 306B, and back into outlet manifold 303' where it exits the sensor assembly 30 through the flange 301'.

As mentioned above, the conduits 306A, 306B can be driven by the driver 304 in a drive mode. According to an embodiment, the drive mode may be, for example, the first out of phase bending mode and the conduits 306A and 306B may be selected and appropriately mounted to the inlet manifold 303 and the outlet manifold 303' so as to have substantially the same mass distribution, moments of inertia, and elastic modules about the bending axes W and W', respectively. As shown, the conduits 306A, 306B extend outwardly from the manifolds 303, 303' in an essentially parallel fashion. Although the conduits 306A, 306B are shown provided with a generally U-shape, it is within the scope of the present embodiment to provide the conduits 306A, 306B with other shapes, such as, for example, straight or irregular shapes. Furthermore, it is within the scope of the present embodiment to utilize vibrational modes other than the first out of phase bending mode as the drive mode.

In the present example, where the drive mode comprises the first out of phase bending mode, the vibrating portion of the conduits 306A, 306B may be driven by the driver 304 at the resonant frequency of the first out of phase bending mode in opposite directions about their respective bending axes W and W'. The driver 304 may comprise one of many well-known arrangements, such as a magnet mounted to the conduit 306A and an opposing coil mounted to the conduit 306B. An alternating current can be passed through the opposing coil to cause both conduits 306A, 306B to oscillate. A suitable drive signal can be applied by one or more meter electronics 20, via lead 310 to the driver 304. It should be appreciated that while the discussion is directed towards two conduits 306A, 306B, in other embodiments, only a single conduit may be provided.

According to an embodiment, the one or more meter electronics 20 produces a drive signal and transmits the drive signal to the driver 304 via lead 310, which causes the driver 304 to oscillate the conduits 306A, 306B. It is within the scope of the present embodiment to produce multiple drive signals for multiple drivers. One or more meter electronics 20 can process the left and right velocity signals from the pick-offs 305, 305' over leads 311, 312, respectively to compute a characteristic of a substance, such as, for example, mass flow rate. The path 26 provides an input and an output means that allows the one or more meter electronics 20 to interface with an operator as is generally known in the art. An explanation of the circuitry of the one or more meter electronics 20 is not needed to understand the present embodiment and is omitted for brevity of this description. It should be appreciated that the description of FIGS. 3 & 4 is provided merely as an example of the operation of one possible vibrating meter and is not intended to limit the teaching of the present embodiment.

As discussed above, in addition to the conduits 306A, 306B vibrating in one or more vibrational modes, the case 330 may be excited in one or more vibrational modes. The excitation may be due to the driver 304 or due to external vibrations. In either situation, vibrational excitation of the case 330 is generally not desired. This is because the one or more excited vibrational modes of the case 300 can be problematic if they overlap with the one or more vibrational modes of the conduits 306A, 306B.

According to an embodiment, the frequencies that induce vibrational modes of the case 330 can be increased compared to the prior art cases shown in the previous figures. According to an embodiment, one or more indentations 332 can be formed in one or both of the case's panels 331a, 331b (See FIGS. 5 & 6). With the exception of the one or more indentations 332, the case's panels 331a, 331b are similar to the panel 101 seen in the prior art cases shown in FIGS. 1 & 2. The one or more indentations 332 can increase the resonant frequencies of the case 330 to provide frequency separation between the one or more vibrational modes of the conduits 306A, 306B and the one or more vibrational modes of the case 330.

According to an embodiment, the one or more indentations 332 can protrude from the associated panel 331a outward (away from the conduits 306A, 306B) or can protrude inward (towards the conduits 306A, 306B). While the indentation 332 protrudes outward in the embodiment shown, the particular direction of the indentation should in no way limit the scope of the present embodiment.

According to an embodiment, at least a portion of the one or more indentations 332 extend completely between at least two edges 333, 334, 335, or 336 of the panel 331a. While four distinct edges are shown in the figures, other case configurations may have less or more than four distinct edges. Therefore, the use of four edges should in no way limit the scope of the embodiments of the claims. In the embodiments shown, the indentations 332 extend between the first edge 333 and the second edge 334. However, in other embodiments, the one or more indentations 332 may be oriented to extend between the third edge 335 and the fourth edge 336, for example. According to an embodiment, the first edge 333 comprises the bottom edge of the first case portion 330a. According to an embodiment, the second edge 334 comprises the upper boundary between the panel 331a and the transition section 337, which joins the panel 331a visible in FIGS. 3 & 4 and the opposing panel 331b (See FIGS. 5 & 6). According to an embodiment, the third and fourth edges 335, 336, provide the boundary to the transition section 337 near the inlet and outlet ends of the case 330. It should be appreciated, that the one or more indentations 332 do not have to extend along the entirety of the edges 333, 334, 335, 336. Rather, so long as a portion of the indentation 332 reaches two or more of the edges 333, 334, 335, 336 sufficient frequency separation can be achieved and the stress created by the indentation 332 can be minimized. For example, as shown in the figures, because of the U-shape of the indentation 332, only a small portion of the indentation 332 extends all the way to the edge 334. An important aspect of extending the indentations 332 between two or more of the edges 333, 334 is that the indentation divides the case panel 331a into several smaller sections, which increases the frequencies of the vibrational modes of the case 330. For example, in the embodiment depicted, the panel 331a is divided into three smaller sections, with the indentation 332 comprising one of the smaller sections. The division of the panel 331a increases the case's natural frequencies. If the indentation 332 did not extend completely between the two edges 333, 334, the panel 331a would only be partially divided and would essentially comprise the prior art ribs as shown in FIG. 2.

As shown in the figures, the indentation 332 does not have to protrude from the remainder of the panel 331a the same amount throughout. For example, in the embodiment shown in the figures, the indentation 332 protrudes a minimum amount, $t_0$, near the edge 333 and reaches a maximum amount, $t_1$, as it approaches the edge 334 (See FIG. 6, for example). The variation in the amount the indentation 332 protrudes from the remainder of the panel 331a may be due to the particular method used to form the indentation 332, for example. For example, the stamping or embossing tool may deform the panel 331a to create the indentation 332 at an angle. Further, the amount the indentation 332 protrudes may be controlled to obtain a desired vibrational mode separation. Additionally, in some embodiments, the amount the indentation 332 protrudes from the remainder of the panel 101 may be a function of the case's wall thickness. For example, a greater amount of protrusion may be acceptable for thicker case walls. Therefore, numerous factors are relevant in determining the particular amount of protrusion of the one or more indentations 332.

Figure 5:
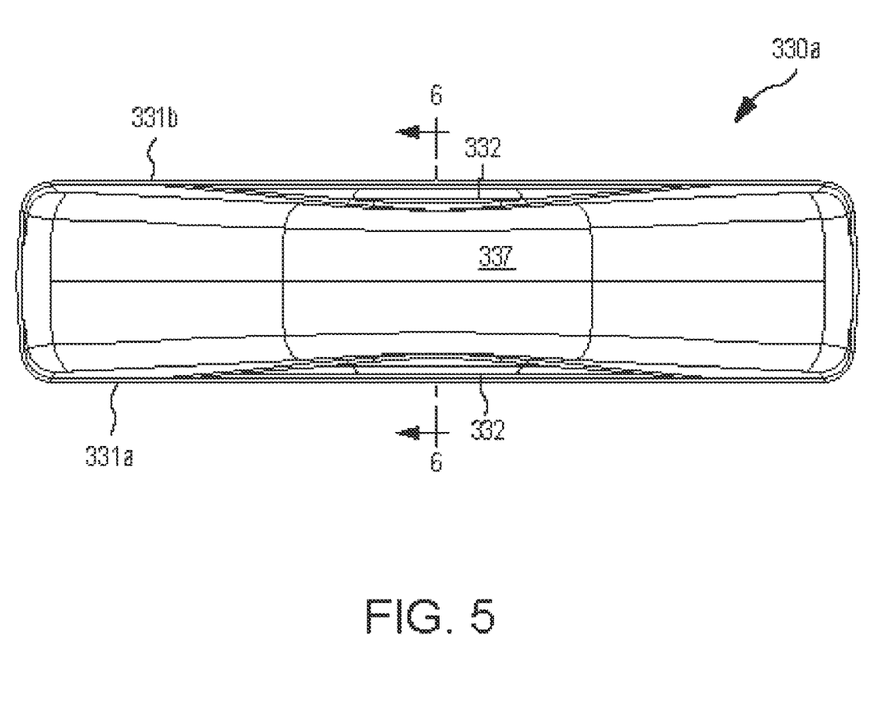
FIG. 5 shows a top view of the case for a vibrating meter according to an embodiment.

FIG. 5 shows a top view of the case 330 according to an embodiment. Now visible in FIG. 5 are both of the panels 331a, 331b one of which is not visible in the previous figures.

Figure 6:
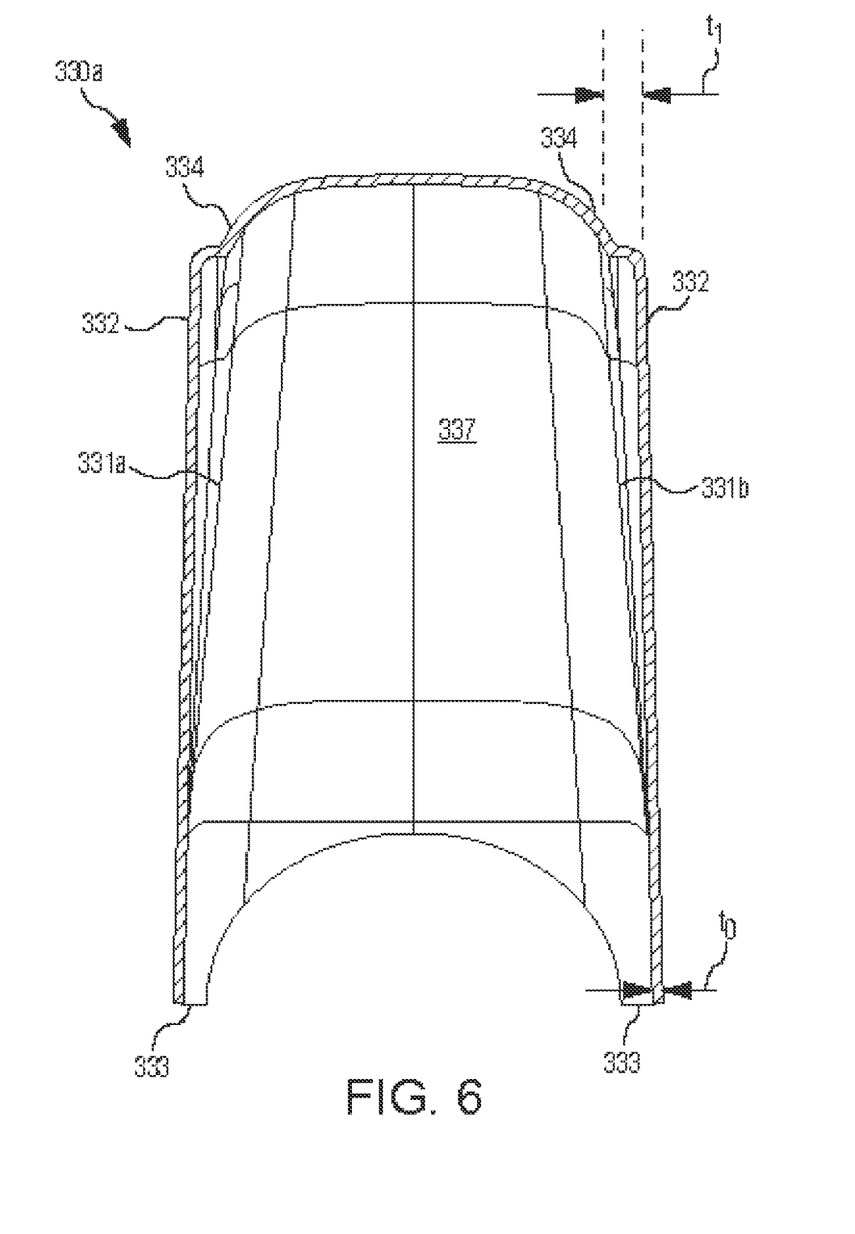
FIG. 6 shows a cross-sectional view of the case for a vibrating meter according to an embodiment.

FIG. 6 shows a cross-sectional view of the case 330 taken along line 6-6 of FIG. 5 according to an embodiment. In FIG. 6, the variation in the amount the one or more indentations protrude from the remainder of the panels 331a, 331b is visible. As mentioned above, in the embodiment shown, the amount of protrusion reaches a maximum of $t_1$ near the second edge 334. However, it should be appreciated that in other embodiments, the amount the one or more indentations 332 protrude from the remainder of the panels 331a, 331b can reach a maximum near the first edge 333. In yet other embodiments, the one or more indentations 332 may comprise substantially equally amounts of protrusion throughout the entire outer surface of the indentation 332.

Figure 7:
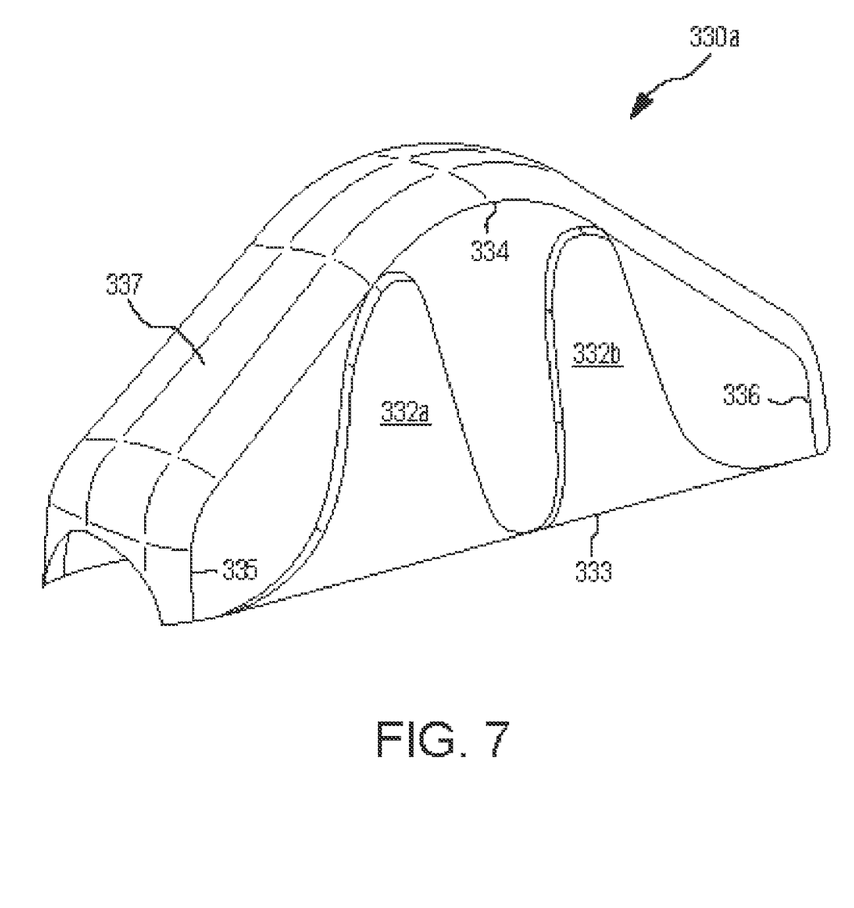
FIG. 7 shows the case of a vibrating meter according to another embodiment.

FIG. 7 shows the case 300 according to another embodiment. As discussed above, more than one indentation may be provided on each of the panels 331a, 331b. In FIG. 7, two indentations 332a, 332b are shown. Similar to the single indentation shown in the previous figures, both of the indentations 332a, 332b extend between the two edges 333, 334. Therefore, the resonant frequencies of the case 330 can be increased compared to the prior art cases shown in FIGS. 1 & 2. In some embodiments, providing multiple indentations 332a, 332b can increase the resonant frequencies of the case 330 further than providing a single indentation as shown in FIGS. 3 & 4. This is because with multiple indentations 332a, 332b, the case's panel 331a is further divided into smaller pieces. For example, the extension of the two indentations 332a, 332b between the two edges 333, 334 creates five separate panel sections, which increases the resonant frequencies of the case 330 even further than in the previous embodiments.

The embodiments described above provide an improved case 330 for a vibrating meter 300. The improved case 330 includes one or more indentations 332 formed in the case's panel 331 that divides the panel 331 into two or more sections to increase the resonant frequencies of the case 330. Unlike prior art ribs 204 that only occupy a small portion of the panel, the indentations 332 of the embodiments described above extend completely between two or more edges 333, 334, 335, 336 of the panel to create distinct panel sections. Consequently, the resonant frequencies of the case can be increased and separated from the intended drive frequencies of the fluid conduits 306A, 306B.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibrating meter cases, and not just to the embodiments described above and shown in the accompanying figures. Accordingly, the scope of the embodiments described above should be determined from the following claims.

We claim:

1. A case (330) for a vibrating meter (300), comprising:
   a first panel (331a) defined by at least a first edge (333) and a second edge (334); and
   one or more bell-shaped indentations (332) formed in the first panel (331a) and including at least a portion intersecting and extending from the first edge (333) to intersect the second edge (334), whereby the case's resonant frequencies are increased.

2. The case (330) of claim 1, wherein the second edge (334) comprises at least a portion of a boundary between the first panel (331a) and a transition section (335) separating the first panel (331a) from a second panel (331b).

3. The case (330) of claim 2, further comprising one or more indentations (332) formed in the second panel (331b) and including at least a portion extending from the first edge (333) to the second edge (334).

4. The case (330) of claim 1, wherein the one or more indentations (332) protrude from a remainder of the first panel (331a) a maximum distance, $t_1$, proximate the second edge (334).

5. A sensor assembly (30) for a vibrating meter (300), comprising:
   one or more fluid conduits (306A, 306B);
   a driver (304) coupled to the one or more fluid conduits (306A, 306B) to vibrate the one or more fluid conduits (306A, 306B);
   one or more pick-offs (305, 305') coupled to the one or more fluid conduits (306A, 306B) to sense a motion of the one or more fluid conduits (306A, 306B); and
   a case (330) enclosing at least a portion of the one or more fluid conduits (306A, 306B) and including:
      a first panel (331a) defined by at least a first edge (333) and a second edge (334); and
      one or more bell-shaped indentations (332) formed in the first panel (331a) and including at least a portion intersecting and extending from the first edge (333) to intersect the second edge (334).

6. The sensor assembly (30) of claim 5, wherein the second edge (334) comprises at least a portion of a boundary between the first panel (331a) and a transition section (335) separating the first panel (331a) from a second panel (331b).

7. The sensor assembly (30) of claim 6, further comprising one or more indentations (332) formed in the second panel (331b) and including at least a portion extending from the first edge (333) to the second edge (334).

8. The sensor assembly (30) of claim 5, wherein the one or more indentations (332) protrude from a remainder of the first panel (331a) a maximum distance, $t_1$, proximate the second edge (334).

9. A method for increasing a resonant frequency of a case for a vibrating meter, comprising a step of:
   forming one or more bell-shaped indentations in at least a first panel of the case with each of the one or more indentations including at least a portion intersecting and extending from a first edge of the first panel to intersect a second edge of the first panel whereby the case's resonant frequencies are increased.

10. The method of claim 9, wherein the second edge comprises at least a portion of a boundary between the first panel and a transition section separating the first panel from a second panel.

11. The method of claim 10, further comprising a step of forming one or more indentations in the second panel with each of the one or more indentations including at least a portion extending from the first edge to the second edge of the second panel.

12. The method of claim 9, wherein the step of forming the one or more indentations comprises protruding the one or more indentations from a remainder of the first panel a maximum distance, $t_1$, proximate the second edge.

* * * * *